Patented July 24, 1951

2,561,458

UNITED STATES PATENT OFFICE 2,561,458

METHOD FOR PREPARING POLYVINYL ACETALS

Jean Bisch, Salindres, France, assignor to Compagnie de Produits Chimiques et Electrometallurgiques Alais Froges et Camargue, Paris, France, a society of France No Drawing. Application July 16, 1948, Serial No. 39,172. In France July 29, 1947

4 Claims. (Cl. 260—73)

Polyvinyl alcohol is prepared by acidic saponification of a polyvinyl ester, the necessary displacement of the chemical equilibrium in the reaction medium being caused or advanced through hydrolysis or alcoholysis. Those methods in which hydrolysis is used, that is which are carried out in the presence of water solutions of acidic catalysts, all employ large amounts of saponifying agents, up to 400% of the treated ester. In some of these methods it has been attempted to somewhat reduce said amount by adding to the reaction medium variable amounts of organic solvents, preferably alcohols, with the purpose of facilitating the saponification by effecting a preliminary dissolution and disturbing the equilibrium of the reaction through the formation of low molecular weight esters. When the polyvinyl alcohol solutions so obtained are used for producing condensation products of the polyvinyl alcohol with one or more aldehydes or ketones for instance, the presence of a large amount of catalyst can only be detrimental to the formation of the acetals, for instance through moving back the chemical equilibrium point of the reaction towards saponification of the latter.

According to the invention it has been found that it is possible to prepare polyvinyl alcohol by saponifying a polyvinyl ester with aqueous solutions of strong mineral acids without any addition of an organic solvent and with the use of small amounts of catalyst, say in the order of 10 to 30% of the ester treated, provided certain specific operating procedures are resorted to, as now to be described.

When a polyvinyl ester is contacted with small quantities of a relatively concentrated aqueous solution of a strong mineral acid, for instance hydrochloric acid at a concentration of at least 20% and preferably at least 25%, it is found that the polymer undergoes swelling, and absorbs the aqueous phase with the catalyst contained therein, without however the saponification reaction thus initiated being sufficient to yield a water-soluble resin.

An expedient makes it possible to displace or disturb the equilibrium of the reaction thus attained, in order to obtain a conversion product which is entirely water-soluble. Said expedient consists of gradually adding increments of water each of which is small as compared with the whole amount of the reaction medium, while allowing, after each successive increment of water is added, sufficient time for the reaction medium to become completely homogenized; for this purpose said medium may for instance be subjected to a mixing or stirring action in any suitable device. After a certain number of such additions have been made the equilibrium will have been sufficiently disturbed to be completely displaced towards the saponification point of the ester, and the catalyst present, even though at a low concentration, is nevertheless sufficient for the reaction to be irreversible. It is then possible to extract the polyvinyl alcohol formed, by conventional methods, for instance by precipitating it with a non-solvent thereof or by separating the lower molecular weight constituents (catalyst and released organic acid) by dialysis, and directly use the solution for the formation of articles out of polyvinyl alcohol.

It is more desirable however to preserve in the solution obtained as above the acidic saponification catalyst and convert the polyvinyl alcohol contained therein into one of its condensation products with one or more aldehydes or ketones for instance, at or about ordinary room temperature. For it has been found that solutions prepared by the above-described method of the invention lend themselves particularly well to the acetalization of polyvinyl alcohol with the carbonyl compounds usually employed to that end. More particularly it has been found possible to carry out such reaction with much lower catalyst concentrations than those required in known methods using water as a reaction medium. When the polyvinyl alcohol solution obtained according to the procedure herein described is diluted with water, it becomes possible to use catalyst concentrations five to ten times lower, while maintaining an acceptable concentration in polyvinyl alcohol as consistent with the acetalization reaction.

The ensuing examples will serve to clearly illustrate the above discussion of the procedure and materials employed in the invention, it being distinctly understood that no restrictive character is to be attached to the nature of the chemicals shown therein, or the formulations or the reaction times specified.

*Example I*

9 parts by weight polyvinyl acetate in the form of beads and 10.8 parts by weight 25% hydrochloric acid are mixed together in a vertical mixer. At the end of 15 to 20 minutes' stirring the resin is found to have greatly swollen and to have absorbed the aqueous catalyst solution. The diffusion of the reagents into each other is allowed to proceed for some time more, the stirring being continued for a short time or the mixture being allowed to stand for from one to three hours. The polyvinyl alcohol beads are then found to be converted into a highly viscous but a homogeneous paste which still is insoluble in water.

3 parts by weight water are then added and the mixture is stirred for a few minutes' time until a smooth homogeneous mass is obtained. Successively and in similar conditions as just described there are added first three times three parts by weight water, then twice five parts water. The final water addition having been completed, the saponification is found to be nearly complete, and the reactive mixture may be diluted with any suitable amount of water in order to complete the saponification while at the same time creating favorable conditions for the ensuing acetalization of the polyvinyl alcohol present. In the particular instance described the mixture was diluted with 25.7 parts water so as to bring down the catalyst concentration to 4.3%. This solution is particularly suitable for the production of polyvinyl acetal.

It is merely required to add thereto at ordinary temperature, slowly and with stirring, say 5 parts paraldehyde to obtain, at the end of from ½ to one hour a resin which is sufficiently hydrophobic for it to be insoluble in the reaction medium and therefore to separate out. To obtain resins having satisfactory general properties it is desirable to allow the precipitate to stand a few hours at ordinary temperature within its mother liquor.

In such conditions there is obtained a powdery and porous acetal containing 8.3% polyvinyl acetate, 14% polyvinyl alcohol groups and 77.7% polyvinyl acetal groups, practically with a quantitative yield.

Example II 9 parts by weight polyvinyl acetate are saponified as in Example I with 10.9 parts by weight 25% hydrochloric acid and the concentration of the polyvinyl alcohol formed is brought down to 7.5% by adding 42 parts by weight water, which are added at the rate of four portions of three parts each followed by six portions of five parts each.

20 parts of the thus prepared solution are removed and there is slowly added thereto an amount of precipitating agent barely sufficient to bring the resin to a state of initiating precipitation, as for instance by adding 48 parts of methyl alcohol. By quickly adding 80 parts methyl alcohol to the mixture while thoroughly stirring it there is obtained a polyvinyl alcohol precipitate practically with a quantitative yield.

Example III 9 parts polyvinyl acetate were saponified in the same operative conditions as in Example I and the catalyst concentration was brought down to 4.30% by dilution with water. The solution was then cooled to 0° C. and 5 parts by weight acetic aldehyde monomer also cooled to 0° C. were added thereto, the mixture being stirred until thoroughly homogeneous. The reaction mixture was then allowed to warm to a temperature of about 15° C. with stirring whereupon a resin separated out having the same appearance as in Example I and having a chemical composition substantially identical to the one indicated above. Herein also the yield was practically the theoretical one.

Example IV 18 parts by weight polyvinyl acetate were mixed with 21.6 parts by weight hydrochloric acid at 25% concentration. At the end of a period of about 2 to 3 hours the resin swelled by the aqueous catalyst solution was converted into a viscous mass resembling that obtained in Example I. Similarly to what was described in that example four additions were made of five parts water each followed by two additions of ten parts water each. Upon completion of the last water addition the saponification was found to be almost complete and the reaction medium could be diluted with 48.7 parts by weight water to bring the catalyst and polyvinyl alcohol concentrations to the desired values.

The polyvinyl alcohol was then acetalized by adding to the solution cooled to 0° C., 3.7 parts by weight acetic acid and 3 parts by weight butyric aldehyde, said additions being separated by a certain interval of time of say half an hour to an hour. The resin separated off almost instantaneously upon the temperature of the reagent medium being brought to 8 to 10° C. It is preferred however for the production of a polyvinyl acetal having satisfactory characteristics to reheat the mixture while continuing stirring until a temperature near to the ordinary temperature is reached, and allow the precipitate to remain in contact with its mother liquor for some hours at such temperature. In such conditions 12.9 parts by weight acetobutyral are obtained containing 3.4% polyvinyl acetate groups, 10.5% polyvinyl alcohol groups and presenting satisfactory resistance to water while having a low degree of thermoplasticity.

What I claim as my invention and desire to secure by Letters Patent is:

1. A process for the preparation of polyvinyl acetals, which comprises subjecting a solid polyvinyl ester in non-colloidal subdivided form to the action of a hydrolyzing agent consisting of a 20 to 25% aqueous solution of hydrochloric acid in an amount equivalent to 10 to 30% of anhydrous hydrochloric acid relative to the weight of the solid ester being treated, until a homogeneous viscous reaction mass is obtained, adding to said reaction mass the water necessary to complete hydrolysis, said water being added in small successive portions and with agitation until homogeneity of the mixture is realized after the addition of each portion of water, further diluting the resultant reaction mixture with water down to a concentration of 5 to 10% of hydrolysis products and 3 to 10% of anhydrous hydrochloric acid, incorporating an aldehyde into the diluted mixture at a temperature at most equal to ambient temperature, and then digesting the resulting precipitate for 3 to 6 hours in its mother liquor.

2. A process for the preparation of polyvinyl acetals, which comprises subjecting a solid polyvinyl ester in non-colloidal subdivided form to the action of a hydrolyzing agent consisting of a 20 to 25% aqueous solution of hydrochloric acid in an amount equivalent to 10 to 30% of anhydrous hydrochloric acid relative to the weight of the solid ester being treated, until a homogeneous viscous reaction mass is obtained, adding to said reaction mass the water necessary to complete hydrolysis, said water being added in small successive portions and with agitation until homogeneity of the mixture is realized after the addition of each portion of water, further diluting the resultant reaction mixture with water down to a concentration of 5 to 10% of hydrolysis products and 3 to 10% of anhydrous hydrochloric acid, incorporating an aldehyde into the diluted mixture at ambient temperature, and then digesting the resulting precipitate for 3 to 6 hours in its mother liquor.

3. A process for the preparation of polyvinyl acetals, which comprises subjecting solid polyvinyl acetate in non-colloidal subdivided form to the action of a hydrolyzing agent consisting of a 20 to 25% aqueous solution of hydrochloric acid in an amount equivalent to 10 to 30% of anhydrous hydrochloric acid relative to the weight of the polyvinyl acetate being treated, until a homogeneous viscous reaction mass is obtained, adding to said reaction mass the water necessary to complete hydrolysis, said water being added in small successive portions and with agitation until homogeneity of the mixture is realized after the addition of each portion of water, further diluting the resultant reaction mixture with water down to a concentration of 5 to 10% of hydrolysis products and 3 to 10% of anhydrous hydrochloric acid, incorporating an aldehyde into the diluted mixture at ambient temperature, and then digesting the resulting precipitate for 3 to 6 hours in its mother liquor.

4. A process for the preparation of polyvinyl acetals, which comprises subjecting a solid polyvinyl ester in non-colloidal subdivided form to the action of a hydrolyzing agent consisting of a 20 to 25% aqueous solution of hydrochloric acid in an amount equivalent to 10 to 30% of anhydrous hydrochloric acid relative to the weight of the solid ester being treated, until a homogeneous viscous reaction mass is obtained, adding to said reaction mass the water necessary to complete hydrolysis, said water being added in small successive portions and with agitation until homogeneity of the mixture is realized after the addition of each portion of water, further diluting the resultant reaction mixture with water down to a concentration of 5 to 10% of hydrolysis products and 3 to 10% of anhydrous hydrochloric acid, incorporating an aldehyde into the diluted mixture at a temperature of 0° C., then heating the mixture up to ambient temperature, and digesting the resulting precipitate for 3 to 6 hours in its mother liquor.

JEAN BISCH.

REFERENCES CITED

The following references are of record in the file of this patent:

UNITED STATES PATENTS

| Number | Name | Date |
|---|---|---|
| 2,333,804 | Malm | Nov. 9, 1943 |
| 2,457,261 | Morrison | Dec. 28, 1948 |